US010753522B2

(12) United States Patent
Peckeu et al.

(10) Patent No.: US 10,753,522 B2
(45) Date of Patent: Aug. 25, 2020

(54) METHOD FOR FORMING A SEAL IN AN END PIECE OF A FLEXIBLE PIPE INCLUDING A PRESSURE SHEATH

(71) Applicant: TECHNIP FRANCE, Courbevoie (FR)

(72) Inventors: Grégory Peckeu, Bourg-Achard (FR); Julia Pinson, Gruchet-le-Valasse (FR); Antoine Colmard, Etoutteville (FR)

(73) Assignee: TECHNIP FRANCE (FR)

( * ) Notice: Subject to any disclaimer, the term of this patent is extended or adjusted under 35 U.S.C. 154(b) by 387 days.

(21) Appl. No.: 15/567,396

(22) PCT Filed: Apr. 20, 2016

(86) PCT No.: PCT/EP2016/058766
§ 371 (c)(1),
(2) Date: Oct. 18, 2017

(87) PCT Pub. No.: WO2016/169987
PCT Pub. Date: Oct. 27, 2016

(65) Prior Publication Data
US 2018/0106405 A1   Apr. 19, 2018

(30) Foreign Application Priority Data
Apr. 20, 2015   (FR) ..................................... 15 53484

(51) Int. Cl.
*F16L 33/22* (2006.01)
*F16L 33/01* (2006.01)
*F16L 11/08* (2006.01)

(52) U.S. Cl.
CPC ............. *F16L 33/224* (2013.01); *F16L 33/01* (2013.01); *F16L 11/083* (2013.01)

(58) Field of Classification Search
CPC .......... F16L 33/224; F16L 33/01; F16L 11/083
See application file for complete search history.

(56) References Cited

U.S. PATENT DOCUMENTS 3,415,545 A    12/1968  Frey et al. .................... 285/149
10,053,267 B2 *  8/2018  Le Blan ................ B65D 59/06

FOREIGN PATENT DOCUMENTS

DE    38 14 410 A1    11/1989
FR    2 782 364 A1     2/2000
(Continued)

OTHER PUBLICATIONS

International Search Report dated Jun. 27, 2016 in corresponding PCT International Application No. PCT/EP2016/058766.
(Continued)

*Primary Examiner* — John C Hong
(74) *Attorney, Agent, or Firm* — Ostrolenk Faber LLP

(57) ABSTRACT

A method includes providing, around an end section of the pressure sheath, of a crimping ring that is intended to be introduced into the pressure sheath; placing, around the end section and the crimping ring, of an end vault of the end piece, the end vault having an engagement surface for engaging with the crimping ring capable of pushing the crimping ring radially into the pressure sheath; relatively moving of the crimping ring in relation to the engagement surface in order to crimp the crimping ring in the pressure sheath. The method includes, prior to the relative movement, a heating of the end section of the pressure sheath, capable of reducing the Young's modulus of the polymer material of the end section of the pressure sheath and of maintaining a reduced Young's modulus during the relative movement step.

18 Claims, 5 Drawing Sheets

(56) References Cited

FOREIGN PATENT DOCUMENTS

| WO | WO 2012/110637 A1 | 8/2012 |
|---|---|---|
| WO | WO 2015/025095 A1 | 2/2015 |

OTHER PUBLICATIONS

Written Opinion dated Jun. 27, 2016 in corresponding PCT International Application No. PCT/EP2016/058766.

\* cited by examiner

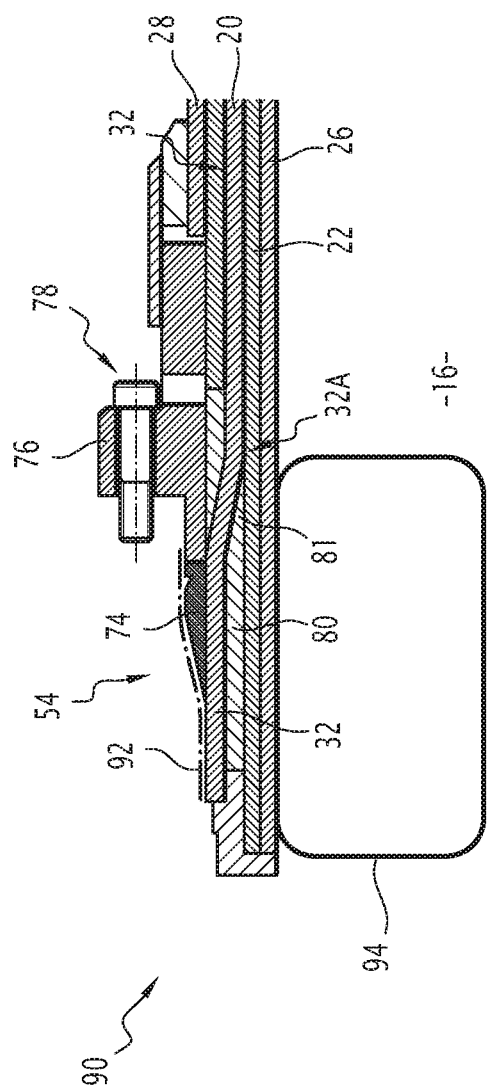
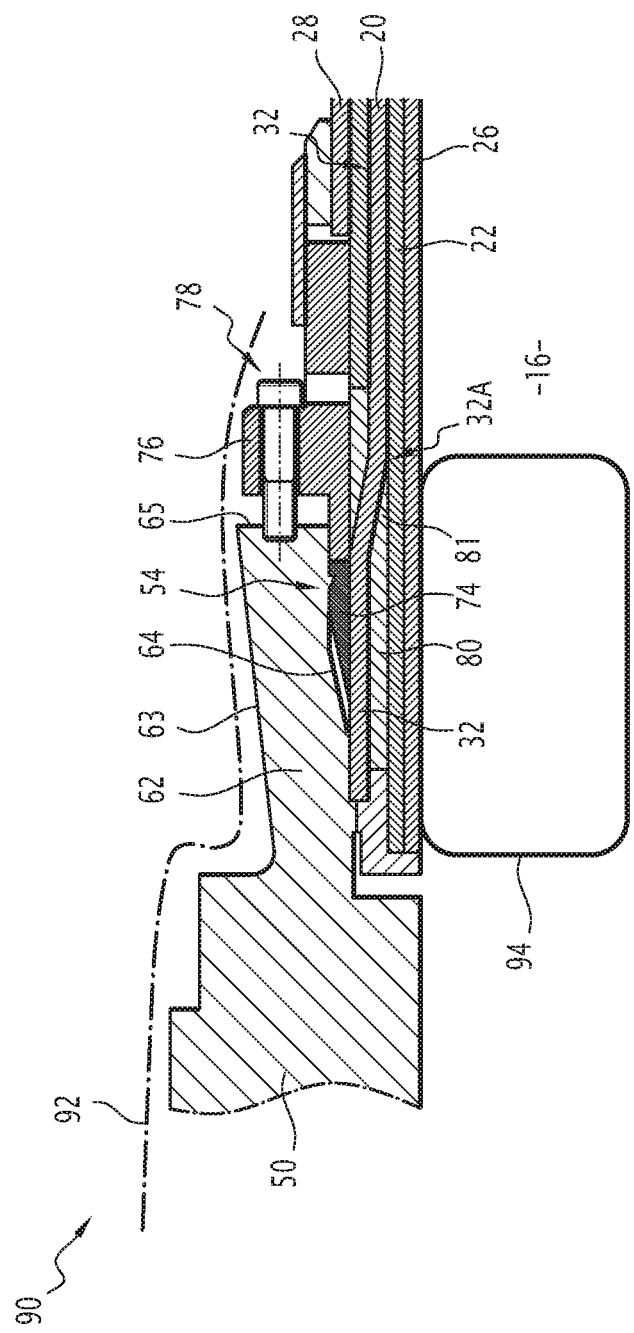

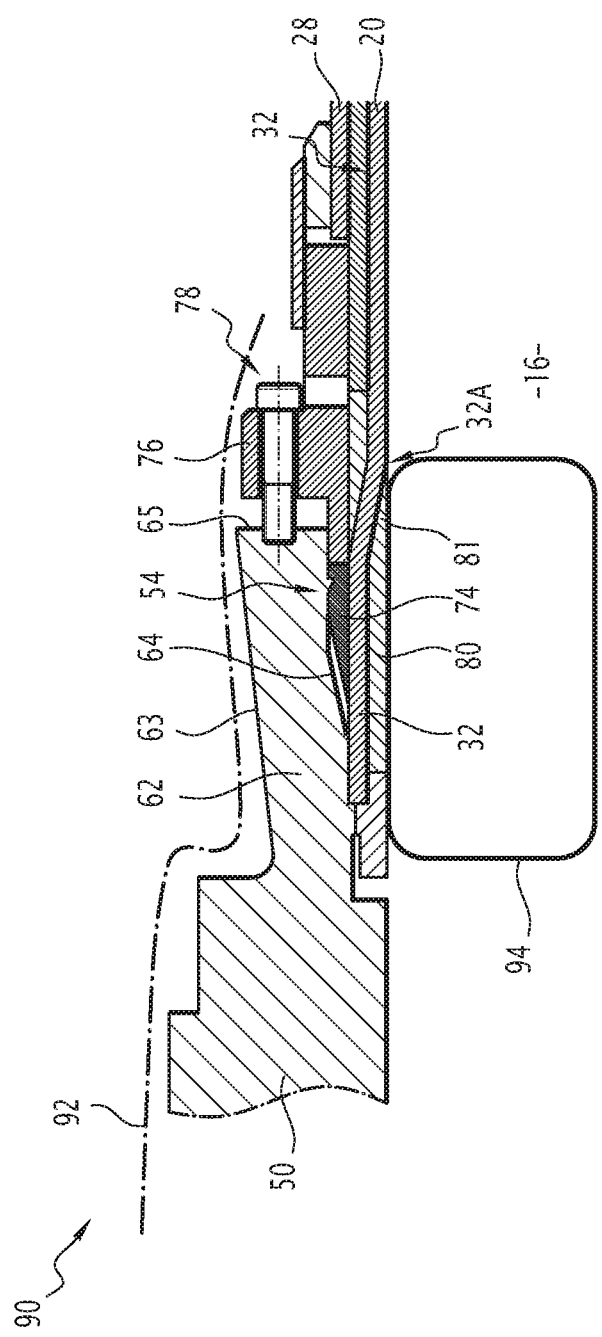

METHOD FOR FORMING A SEAL IN AN END PIECE OF A FLEXIBLE PIPE INCLUDING A PRESSURE SHEATH

CROSS-REFERENCE TO RELATED APPLICATIONS

The present application is a 35 U.S.C. §§ 371 national phase conversion of PCT/EP2016/058766, filed Apr. 20, 2016, which claims priority to French Patent Application No. 1553484, filed Apr. 20, 2015, the contents of which are incorporated herein by reference. The PCT International Application was published in the French language.

BACKGROUND AND SUMMARY OF THE INVENTION

The present invention relates to a seal forming method for forming a seal in an end piece of a flexible pipe comprising a pressure sheath, which includes the following steps:
- provision, around an end section of the pressure sheath, of a crimping ring that is intended to be introduced into the pressure sheath;
- placement, around the end section and the crimping ring, of an end vault of the end piece, the end vault having an engagement surface for engaging with the crimping ring, capable of pushing the crimping ring radially into the pressure sheath;
- relative movement of the crimping ring in relation to the engagement surface in order to crimp the crimping ring in the pressure sheath.

The flexible pipe is advantageously a flexible pipe type that is not bonded (referred to as "unbonded") intended for the transport of hydrocarbons through a body of water such as an ocean, a sea, a lake or a river. By way of a variant, the flexible pipe line is an umbilical pipe that is reinforced with armor elements or even a cable.

Such a flexible pipe is for example made in accordance with the standard-setting document API 17J (Specification for Unbonded Flexible Pipe) and API RP 17B (Recommended Practice for Flexible Pipe) established by the American Petroleum Institute.

By way of a variant, the flexible pipe is dedicated to applications related to drilling and refinery, bearing the acronym "DRAPS", manufactured and marketed by the Applicant. This flexible pipe is for example a discharge pipe (per the terminology, known as "choke line") and a seal-off line (per the terminology, known as "kill line") as described by the standard-setting document the API 16C established by the American Petroleum Institute.

Preferably, this type of pipe is designed to be disposed in a body of water but it can sometimes be used on land over the mainland.

The pipe is generally formed of an assembly of superposed and concentric, polymer and metallic layers. It is considered to be "unbonded" within the context of the present invention given that at least one of the layers of the pipe is capable of moving longitudinally in relation to the adjacent layers upon the flexion or bending of the pipe. In particular, an unbonded pipe is a pipe that has no bonding materials joining the layers that form the pipe.

The pipe is generally disposed across a body of water, between a bottom assembly, designed for collecting the fluid from the operation at the bottom of the body of water, and a surface assembly that may be floating or fixed, designed for collecting and distributing the fluid. The surface assembly may be a semi-submersible platform, a floating production storage and offloading (FPSO) unit or other type of floating assembly.

Some of these pipes are used in very severe conditions. Thus, the hydrocarbons conveyed may have a pressure and a temperature that are very high, for example a pressure comprised between 500 bar and 1500 bar, and a temperature of between 110° C. and 130° C. In addition, in the event of the pipe being submerged at a great depth, the latter must be capable of withstanding a very high external pressure, for example of the order of 250 bar if the pipe is submerged at a depth of 2500 metres.

In order to respond to such performance requirements, it is a known practice to use pressure sheaths made from high performance polymer materials which preferably have a Young's modulus of at least 2000 MPa, such as, for example PEK (polyether ketone), PEEK (polyether ether ketone), the PEEKK (polyether ether ketone ketone), PEKK (polyether ketone ketone), PEKEKK (polyether ketone etherketone ketone), PAI (polyamide imide), PEI (polyether imide), PSU (polysulfone), PPSU (polyphenylsulfone), PES (polyethersulfone), PAS (polyaryl sulfone), PPE (polyphenylene ether), PPS (polyphenylene sulfide) LCP (liquid crystal polymers), PPA (polyphthalamide) and/or the mixtures thereof, or even in mixture with PTFE (polytetrafluoroethylene) or PFPE (perfluoropolyether).

The use of these materials can cause problems during the forming of the seal around the pressure sheath, during the mounting of the end pieces.

Indeed, during this mounting, a ring is crimped at the level of the external surface of the pressure sheath such as to become embedded therein. The vault of the end piece is pushed axially along the pipe, in a manner such that the crimping ring comes into contact with an inclined surface of the vault of the end piece. This results in a radial pressure or "tube expansion" on the crimping ring, which penetrates radially into the thickness of the pressure sheath. This being done, the pressure sheath is crimped and the sealing is formed.

This operation is easily executable for pressure sheaths made from polymer materials which exhibit a low Young's modulus in the usual temperature range for this type of operation, for example [−10° C.; +40° C.].

However, for certain high-performance polymer materials, the crimping operation is far more complicated. In effect, with their Young's modulus being higher, in the aforementioned temperature range, the crimping is much more difficult.

In order to crimp polymer sheaths made from high performance materials while keeping the same end piece design, it is necessary to use hydraulic devices that generate several tens of tonnes of thrust in order to position the vault of the end piece around the end of the pipe.

The application of such a force may in addition result in the deformation of the metal carcass (in the event of the pipe being of the "rough-bore" type) which can lead to a loss of sealing in the end piece.

An object of the invention is therefore to facilitate the crimping of the pressure sheath during the mounting of the terminal end pieces, in particular when the pressure sheath is made from high performance polymer materials.

To this end, the subject matter of the invention relates to a method of the aforementioned type, characterized in that the method includes, prior to the relative movement step, a step of heating of the end section of the pressure sheath, capable of reducing the Young's modulus of the polymer material of the end section of the pressure sheath and of maintaining a reduced Young's modulus during the relative movement step.

The method according to the invention may include one or more of the following features, taken into consideration in isolation or in accordance with any technically possible combinations:
- the Young's modulus of the polymer material of the end section of the pressure sheath, during the step of relative movement, is less than 1000 Mpa, and is in particular comprised between 50 MPa and 500 MPa;
- the temperature of the end section of the pressure sheath, during the step of relative movement, is higher than the ambient temperature;
- the temperature of the end section of the pressure sheath, during the step of relative movement, is higher than 50° C. and is in particular comprised between 100° C. and 200° C.;
- the pressure sheath is made from a polymer material selected from among PVDF, PEK, PEEK, PEEKK, PEKK, PEKEKK, PAI, PEI, PSU, PPSU, PES, PAS, PPE, PPS, LCPs, PPA and/or the mixtures the thereof;
- the end section of the pressure sheath is heated from the exterior during the step of heating;
- an exterior surface of the end section of the pressure sheath is heated by means of direct contact of a heating member with the pressure sheath and/or with the crimping ring;
- the step of placement of the end vault is carried out prior to the step of heating, with the heating step comprising of the heating of the end vault by means of direct contact of the end vault with a heating member, and the heating of an exterior surface of the end section of the pressure sheath through the end vault.
- the heating member is a heating strip and/or a heating cover-sheet;
- the end section of the pressure sheath is heated from the interior during the step of heating;
- the end section of the pressure sheath is disposed around an internal carcass that defines an internal circulation passage for circulating the fluid, the heating step comprising of the heating from the interior of the internal carcass;
- the internal carcass is heated by means of a heating mandrel and/or by circulation of hot air in the fluid circulation passage;
- a cannula is interposed between a sacrificial sheath arranged around the internal carcass and the intermediate section of the pressure sheath, the cannula being heated in the heating step by the internal carcass, an internal surface of the end section of the pressure sheath being heated by the cannula;
- the method as defined here above includes a measurement step of measuring the temperature of the end section of the pressure sheath during the heating step;
- the relative movement of the crimping ring in relation to the end vault is a radial movement along an axis of the flexible pipe.

BRIEF DESCRIPTION OF THE DRAWINGS

The invention will be better understood upon reading the description which will follow, provided solely by way of example and with reference being made to the accompanying drawings, in which:

FIG. 3 is a partial view of the relevant parts of an end piece of the flexible pipe represented in FIG. 1, over the course of mounting, during the operational implementation of the seal forming method for forming a seal according to the invention;

FIG. 4 is a view that is analogous to that in FIG. 3, in a variant embodiment of the method for forming a seal according to the invention;

FIG. 5 is a view that is analogous to that in FIG. 4, for the end piece of another flexible pipe;

DESCRIPTION OF PREFERRED EMBODIMENTS

In all of the following sections, the terms "exterior" and "interior" are generally to be understood in a radial sense in relation to an axis X-X' of the pipe, the term "exterior" being understood as being relatively farther away radially from the axis X-X' and the term "interior" being understood as being relatively closer radially to the axis X-X' of the pipe.

The terms "front" and "rear" are generally to be understood in an axial sense in relation to an axis X-X' of the pipe, the term "front" being understood as being relatively farther away from the middle of the pipe and closer to one of the ends thereof, the term "rear" being understood as being relatively closer to the middle of the pipe and farther away from one of the ends thereof. The middle of the pipe is the point of the pipe that is located equidistant from the two ends thereof.

A first method for forming a seal according to the invention is carried out during the mounting of an end piece 14 of a flexible pipe 10 intended to be introduced into a body of water for conveying a fluid.

Figure 1:
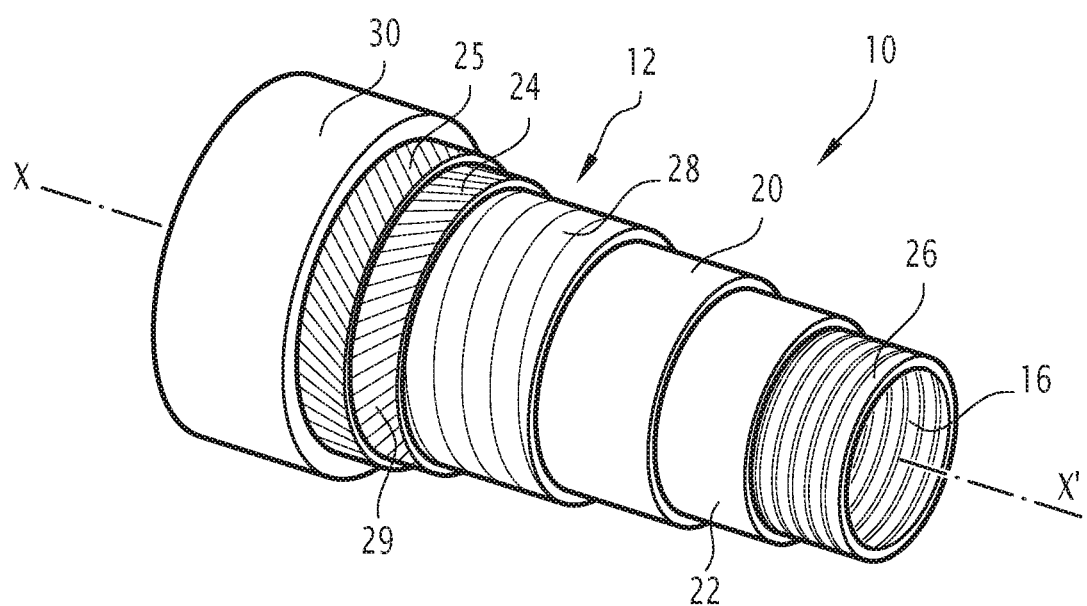
FIG. 1 represents a partially broken away view in perspective of a first flexible pipe according to the invention.

The flexible pipe 10 comprises a central section 12 illustrated in part in FIG. 1. It comprises, at each of the axial ends of the central section 12, a terminal tip-end 14 the relevant parts whereof are represented in FIG. 2.

Figure 2:
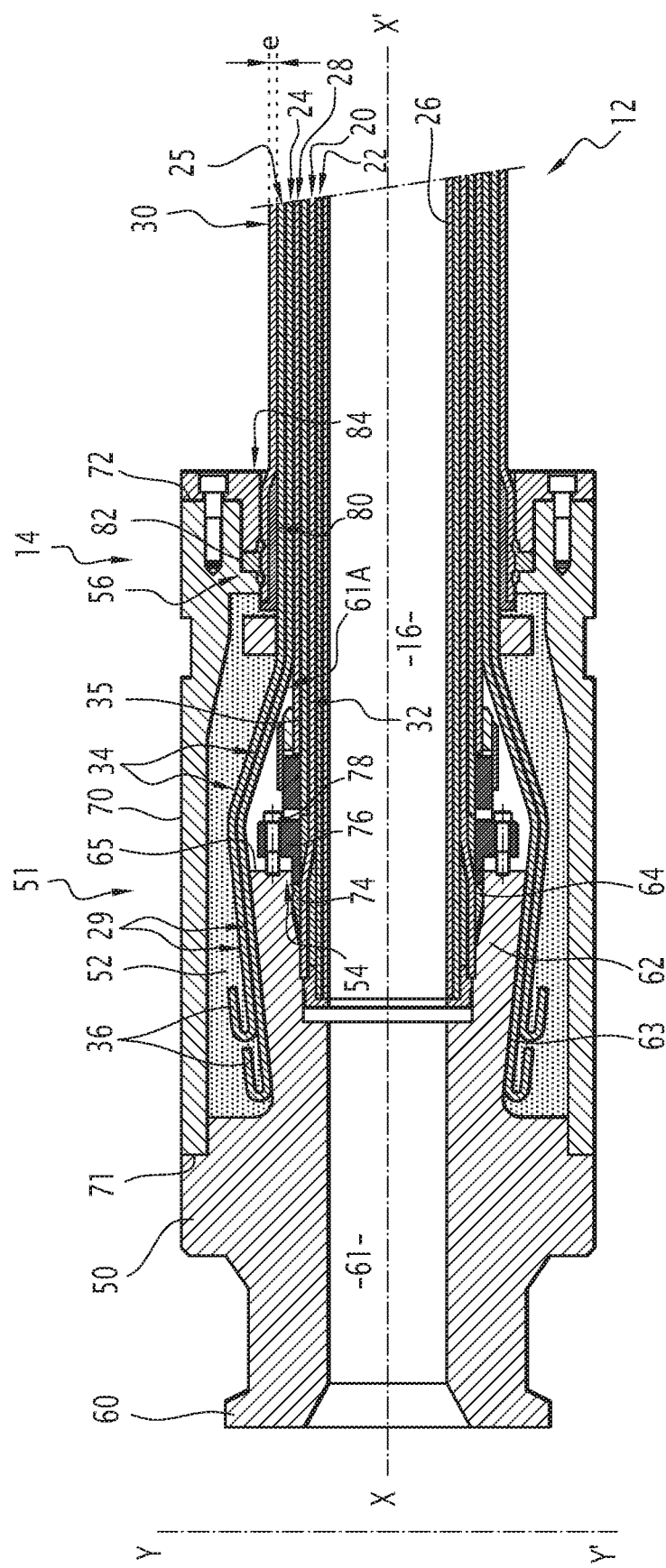
FIG. 2 is a partial view, taken in cross section along a median axial plane, of the end piece of the first flexible pipe according to the invention.

In FIG. 2, in addition to the terminal tip-end 14, a portion of the central section 12 that is adjacent to the end piece 14 is represented.

With reference to FIG. 1, the flexible pipe 10 delimits a central fluid circulation passage 16 for circulating a fluid, advantageously a petroleum fluid. The central passage 16 extends along an axis X-X', between the front end and the rear end of the flexible pipe 10. It opens out through the end pieces 14.

Also defined in all of the following sections, is a radial axis Y-Y' that is perpendicular to the axis X-X' and situated in a median axial plane of the flexible pipe 10, as can be seen in FIG. 2.

The flexible pipe 10 is intended to be disposed through a body of water (not represented) in a fluid exploitation installation for exploiting fluids such as, in particular hydrocarbons.

The body of water is, for example, a sea, a lake or an ocean. The depth of the body of water, directly in line with the fluid exploitation installation is for example comprised between 500 m and 3500 m.

The fluid exploitation installation includes a surface assembly that is in particular a floating assembly and a bottom assembly (not represented) which are generally connected to each other by the flexible pipe 10.

By way of a variant, as mentioned above, the flexible conduit is disposed on land over the mainland.

The flexible pipe 10 is preferably a pipe that is "not bonded" (per the accepted terminology, referred to as "unbonded").

At least two adjacent layers of the flexible pipe 10 are free to move longitudinally in relation to each other upon the flexion or bending of the pipe.

Advantageously, all of the layers of the flexible pipe are free to move in relation to each other. Such behaviour is described for example in the standards-setting documents API 17J, API RP17B and API 16C, published by the American Petroleum Institute (API).

As illustrated in FIG. 1, the flexible pipe 10 delimits a plurality of concentric layers around the axis X-X', which extend continuously along the central section 12 up to the end pieces 14 situated at the ends of the pipe.

According to the invention, the flexible pipe 10 includes at least one first tubular sheath 20 made from a polymer material that advantageously constitutes a pressure sheath. Advantageously, the flexible pipe 10 comprises a plurality of polymeric tubular sheaths such as an intermediate sheath or sacrificial sheath 22. It may comprise one or two polymeric sheaths in addition to the pressure sheath 20.

The flexible pipe 10 additionally also comprises at least one layer of tensile armors 24, 25 disposed externally in relation to the first sheath 20 that forms a pressure sheath.

In this example, the flexible pipe 10 in addition comprises an internal carcass 26 disposed within the interior of the sacrificial sheath 22, with the pressure sheath 20 disposed over the sacrificial sheath 22, a pressure vault 28 interposed between the pressure sheath 20 and the at least one layer of traction armors 24, 25 and an external sheath 30, intended to protect the flexible pipe 10.

The sacrificial sheet 22 for example is made from a polyolefin based material such as polyethylene, a polyamide based material such as PA11 or PA12, or a fluorinated polymer based material such as polyvinylidene fluoride (PVDF).

By way of a variant, an additional polymeric sheath made from the same polymer materials as those of the sacrificial sheet 22 is disposed between the pressure sheath 20 and the pressure vault 28.

In known manner, the pressure sheath 20 is designed to confine in a sealed manner the fluid being conveyed in the passage 16. It is formed of polymer material, for example a PAEK (polyarylether ketone) based material such as PEEK (polyether ether ketone), PEKK (polyether ketone ketone), PEK (polyether ketone), PEEKK (polyether ether ketone ketone), PEKEKK (polyether ketone etherketone ketone), or for example a PSU (polysulfone) based material such as PPSU (polyphenylsulfone), PES (polyethersulfone), PAS (polyaryl sulphone), or a polyimide (PI) based material such as PAI (polyamide imide), PEI (polyether imide), or a PPE (polyphenylene ether) based material, a PPS (polyphenylene sulfide) based material, LCP (liquid crystal polymers) based material, a PPA (polyphthalamide) based material, a COC (cyclic olefin copolymer) based material and/or material made from mixtures thereof, or even in admixture with a fluorinated or perfluorinated lubricant of such type as PTFE (polytetrafluoroethylene) or PFPE (perfluoropolyether).

By way of a variant, the pressure sheath 20 is made from a polyolefin based material such as polyethylene, a polyamide based material such as PA11 or PA12, or a fluorinated polymer based material such as polyvinylidene fluoride (PVDF) or a material based on a fluorinated copolymer containing vinylidene fluoride.

The polymer material forming the pressure sheath 20 has a Young's modulus at ambient temperature, for example at 23° C.±2° C., comprised between 100 MPa and 4000 MPa, as measured according to the Standard ISO 527-1: 2012 or ASTM D638-10. Advantageously, the modulus is comprised between 2000 MPa and 4000 MPa, as measured according to this Standard.

The thickness of the pressure sheath 20 is for example comprised between 5 mm and 20 mm.

The pressure sheath 20 comprises an end section 32 that is inserted into the end piece 14.

The carcass 26 is formed for example from a profiled metal strip sheet, that is wound spirally. The coils of the strip sheet are advantageously stapled to each other. The main function of the carcass 26 is to absorb the radial compressive forces.

In this example, the carcass 26 is disposed within the interior of the pressure sheath 20. The pipe is then referred to by the term "rough bore" on account of the geometry of the carcass 26.

The carcass 26 is able to enter in contact with the fluid circulating in the sacrificial sheath 22.

The helical winding of the profiled metal strip sheet that forms the carcass 26 is a short pitch winding, that is to say that, it has a helix angle having an absolute value approaching 90°, typically comprised between 75° and 90°.

The main function of the pressure vault 28 is to absorb the radial forces associated with the pressure prevailing within the interior of the pressure sheath 20. The pressure vault 28 is for example formed by a metal profiled wire wound helically around and on the exterior of the sheath 20. The profiled wire generally has a complex geometry, in particular in a form that is Z-shaped, T-shaped, U-shaped, K-shaped, X-shaped or I-shaped.

The pressure vault 28 is helically wound with a short pitch around the pressure sheath 20, that is to say with a helix angle having an absolute value that is approaching 90°, typically comprised between 75° and 90°.

The pressure vault 28 has an end region 35 that is inserted into the end piece 14, from the exterior of the end section 32 of the pressure sheath 20. The end section 32 of the pressure sheath 20 projects out axially towards the front beyond the end region 35 of the pressure vault 28.

The flexible pipe 10 according to the invention comprises at least one armor layer 24, 25 formed of a helical winding of at least one elongated armor member 29.

In the example represented in FIG. 2, the flexible pipe 10 comprises a plurality of armor layers 24, 25, in particular an interior armor layer 24, applied on the pressure vault 28 and an exterior armor layer 25 around which is disposed the exterior sheath 30.

Each layer of armors 24, 25 comprises longitudinal armor elements 29 wound with a long pitch around the axis X-X' of the pipe.

The expression "wound with a long pitch" is understood to indicate that the absolute value of the helix angle is less than 60°, and is typically comprised between 25° and 55°.

The main function of the armor layers 24, 25 is to absorb the axial tensile forces exerted on the flexible pipe 10, in particular those related to the hanging weight in the case of a riser pipe.

The armor elements 29 of a first layer 24 are generally wound at an opposite angle in relation to the armor elements 29 of a second layer 25. Thus, if the winding angle of the armor elements 29 of the first layer 24 is equal to +α, α being comprised between 25° and 55°, the winding angle of the armor elements 29 of the second armor layer 25 disposed to be in contact with the first armor layer 24 is for example equal to −α°.

The armor elements 29 are for example formed by metal wires, in particular steel wires, or by bands made of composite material, for example bands that are reinforced with carbon fibre.

As will be seen here below, the armor elements 29 each have an end section 34 that is introduced into the end piece 14. The end section 34 extends up to a free end 36 disposed in the end piece 14. It advantageously has a pseudo-helical trajectory with axis X-X' in the end piece 14, with the helix winding over a conical envelope.

In the example represented in FIG. 2, for each armor layer 24, 25, the end sections 34, of the armor elements 29 extend in a manner that diverges away from the axis X-X', and converges towards the axis X-X' from a rear detachment point 61A towards a free front end 36.

The external sheath 30 is intended to prevent the permeation of fluid from the exterior of the flexible pipe 10 towards the interior. It is advantageously made of polymer material, in particular a polyolefin based material, such as polyethylene, or a polyamide based material, such as PA11 or PA12.

The thickness of the external sheath 30 is for example comprised between 5 mm and 15 mm.

As illustrated in FIG. 2, in addition the end sections 34 of the armor elements 29, the end section 32 of the pressure sheath 20, the end section 32A of the sacrificial sheath 22 (visible in FIGS. 3 and 4) and the end region 35 of the pressure vault 28, each end piece 14 includes an end vault 50 and an exterior connecting cover 51 that projects out axially towards the rear from the vault 50.

The cover 51 delimits, with the vault end 50, a reception chamber 52 for receiving the end sections 34 of the armor elements 29, and the end region 35 of the vault 28.

The end piece 14 comprises, in addition, a front sealing assembly 54 for sealing around the pressure sheath 20 and a rear sealing assembly 56 for sealing around the external sheath 30.

In this example, the end vault 50 is intended for connecting the flexible pipe 10 to another connection end piece 14 or to the terminal equipment units, advantageously by means of an end flange 60.

The end vault 50 has a central bore 61 intended for receiving the end of the pressure sheath 20 and for enabling the flow of the fluid circulating through the central passage 16 towards the exterior of the flexible pipe 10.

The end vault 50 has at the rear, positioned to be facing the cover 51, a supporting skirt 62 of the end sections 34 of the armor elements 29.

The skirt 62 defines an exterior peripheral surface 63, in this case of a frusto-conical form that is convergent towards the front, an interior peripheral engagement surface 64 for engaging with the front sealing assembly 54, and a rear annular transverse surface 65, that connects the exterior peripheral surface 63 to the interior peripheral surface 64.

The engagement surface 64 has a divergent form that diverges away from the axis X-X' towards the rear, intended to engage with the front sealing assembly 54.

The cover 51 includes a tubular peripheral wall 70 extending around the axis X-X'. The peripheral wall 70 has a front edge 71 secured on to the end vault 50, at a distance radially away from the armor layers 24, 25 and a rear edge 72 extending axially towards the rear beyond the end vault 50.

The cover 51 delimits the chamber 52 radially towards the exterior. A filler material advantageously fills the chamber 52. The filler material is for example an epoxy resin.

The front sealing assembly 54 is advantageously situated at the front of the end piece 14, in contact with the end vault 50.

It comprises a front crimping ring 74, intended for engaging on the pressure sheath 20 during the implementation of the method according to the invention, a front support flange 76 on the front ring 74 and a crimping assembly 78 for crimping the front flange 76 on to the end vault 50 so as to block the axial movement of the front ring 74 when the end vault 50 comes to be axially displaced in order for it to be positioned around the end section 32 of the pressure sheath 20.

In the example illustrated in FIG. 3, the front sealing assembly 54 further also comprises a cylindrical support cannula 80 for supporting the end section 32, that is interposed between the sacrificial sheath 22 and the end section 32 of the pressure sheath 20, so as to be facing axially the front crimping ring 74.

The front ring 74 is wedged below the engagement surface 64. It is capable of deforming radially towards the interior in the end section 32 of the pressure sheath 20, as a result of the wedge effect, during an axial movement towards the rear of the end vault 50 while the front ring 74 is axially blocked by the front flange 76.

The ring 74 advantageously has a tapered front edge having an annular bulge.

Thus, during the axial movement towards the rear of the end vault 50, the tapered front edge of the ring 74 comes to bear on the engagement surface 64 resulting in a relative movement of the ring 74 in relation to the end vault 50.

The relative movement of the ring 74 in relation to the end vault 50 is a radial movement along the axis X-X' of the flexible pipe 10. In this way the annular bulge of the tapered front edge of the front ring 74 penetrates into the end section 32 and makes it possible to form an annular sealing by crimping of the ring 74.

The front flange 76 is wedged between the end of the pressure vault 28 and the rear of the crimping ring 74. It is capable of abutting against the transverse surface 65 of the end vault 50 during the mounting of the crimping assembly 78.

The crimping assembly 78 in this case includes screws that is capable of being inserted into the support skirt 62 of the end vault 50 through the front flange 76 and the transverse surface 65.

The cannula 80 is of a cylindrical form with axis X-X'. It is wedged around the sacrificial sheath 22. It has a tapered rear end 81 that makes possible the detachment of the end section 32 after the insertion of the cannula 80.

The rear sealing assembly 56 is placed at the rear of the front sealing assembly 54.

It comprises at least one rear crimping ring 82 that crimps the external sheath 30, and one rear crimping flange 84 for crimping the rear ring 82 on to the cover 51, advantageously at the level of the rear edge 72 of the peripheral wall 70.

For the implementation of the method according to the invention, a heating device 90, shown schematically in FIG. 3, is used so as to locally heat the end section 32 of the polymer material forming the pressure sheath 20, in order to reduce its Young's modulus.

In the example illustrated in FIG. 3, the heating device 90 comprises of a heating member 92 positioned to be in contact with the end section 32 of the pressure sheath 20 and/or of the front crimping ring 74, in order to heat the end section 32 of the pressure sheath 20 from the exterior.

The heating device 90 in this case also comprises a heating mandrel 94, that is introduced into the carcass 26 in order to heat the end section 32 of the pressure sheath 20 from the interior.

The heating member 92 is for example a heating coversheet, that is wound around the sheath 20 and the ring 74 and/or a heating strip. The heating member 92 is capable of heating the end section 32 by means of direct contact with the end section 32 or through the crimping ring 74.

The heating mandrel 94 is preferably placed in contact with the carcass 26. It is capable of heating the end section 32 through the sacrificial sheath 22 and/or the cannula 80.

A description will now be provided of one embodiment of a seal forming method for forming a seal according to the invention, during the mounting of the end piece 14 to end of the central section 12 of the flexible pipe 10.

Initially, the central section 12 is provided. An end section of the external sheath 30 is cut away in order to expose the end sections 34 of the armor elements 29, and below, the pressure vault 28, the pressure sheath 20, the sacrificial sheath 22 and the internal carcass 26.

The elements constituting the rear sealing assembly 56 and the cover 51 are engaged around the external sheath 30 and are moved towards the rear.

The armor elements 29 are moved away radially from the end section 32 of the pressure sheath 20 and an end portion of the vault 28 is cut away in order to show the end section 32 of the pressure sheath 20.

The cannula 80 is then placed in position between the end section 32 and the sacrificial sheath 22.

The front support flange 76 is engaged around the end section 32 and is moved towards the rear. The crimping ring 74 is then mounted around the end section 32 until such point as it abuts against the front flange 76.

In the example represented in FIG. 3, the heating member 92 is then set in place. It is wound around the crimping ring 74 and the end section 32 in order to enter into contact with the end section 32 and with the crimping ring 74 that it covers.

In similar manner, the heating mandrel 94 is introduced into the carcass 26 and is positioned to be axially facing the end section 32, of the crimping ring 74 and the cannula 80.

Advantageously, the temperature sensors are placed in contact with the section 32 between the heating member 92 and the end section 32.

The heating member 92 and the heating mandrel 94 are then activated in order to raise the temperature of the end section 32 of the pressure sheath 20 to a temperature that is higher than the ambient temperature.

Preferably, the temperature of the end section 32 is increased up to a set point temperature comprised between 100° C. and 200° C.

Advantageously, this temperature is higher than 50° C., in order to ensure the release of stresses after the crimping.

The temperature of the end section 32 of the pressure sheath 20 is selected so as to ensure that the Young's modulus of the polymer material of the end section 32 after heating is less than 1000 MPa, and is in particular comprised between 50 MPa and 500 MPa.

This being done, the heating member 92 is removed and the end vault 50 is engaged around the pressure sheath 20 in order to place the support skirt 62 so as to be facing the end section 32.

The crimping ring 74 is thus then disposed to be in contact with the internal engagement surface 64.

The crimping assembly 78 is placed in position in order to axially block towards the rear the front support flange 76. The end vault 50 is moved axially towards the rear. As a result of the wedge effect, the tapered front edge of the crimping ring 74 comes to bear on the internal engagement surface 64 and is deformed radially towards the axis X-X' in the end section 32 in order to form an annular sealing by crimping.

The radial depth of penetration of the ring 74 is for example greater than 20% of the local thickness of the end section 32 of the pressure sheath 20.

The Young's modulus of the polymer material of the end section 32 having been locally lowered, it is possible to crimp the sheaths produced from materials based on high performance polymers having a high Young's modulus at ambient temperature, preferably greater than or equal to 2000 MPa, with a greatly reduced crimping force, and a reduced pressure of the sheath 20 against the carcass 26.

This greatly improves the crimping level, with an enhanced degree of reliability. The crimping operation is less fastidious for the operators, when the latter perform the crimping with screws. The screws used in the crimping assembly 78 are advantageously reduced in size or in number, which can reduce the dimensional footprint of the end piece 14 and the diameter thereof. Also, the screws are subjected to less stress, which makes it possible to use screws with a reduced quality rating.

In addition, the reduction of the pressure applied by the sheath 20 of the carcass 26 makes it possible to use cannulas 80 having reduced thickness.

When a high temperature is used for the heating of the pressure sheath 20, only one heating operation is required in order to ensure both the crimping by means of the ring 74 and the release of stresses after crimping.

It is therefore possible to use high performance polymers that are suitable for high temperatures and at high pressures in order to produce the pressure sheath 20 of a flexible pipe 10, without risk of deterioration of the seal at the level of the end piece 14, and by using an end piece 14 design that is identical to the one used for standard polymers. The flexible pipe 10 is therefore particularly adapted and capable of conveying high temperature and high pressure fluids.

In the variant of the method illustrated in FIG. 4, the end vault 50 is placed in position around the end section 32 and the front crimping ring 74, prior to the heating of the end section 32. The heating member 92 is then positioned to be in contact with an external peripheral surface 63 of the skirt 62 in order to heat the vault 50 and the end section 32 through the skirt 62, prior to the crimping of the support ring 76 by the crimping assembly 78.

According to another variant, the mandrel 94 is replaced by a supply of hot air circulating through the circulation passage 16.

According to another variant, a heating pot is disposed externally around the end section 32, in the embodiment represented in FIG. 3, or around the vault 50, in the embodiment represented in FIG. 4.

According to yet another variant, the cannula 80 is introduced between the sacrificial sheath 22 and the end section 32 of the pressure sheath 20, after heating of the end section 32.

According to one variant embodiment of the flexible pipe 10, illustrated in FIG. 5 the pipe 10 does not include an internal carcass 26 and is thus then referred to by the term "smooth-bore". The pressure sheath 20 is the layer situated farthest within the interior of the structure of the pipe 10 in contact with the fluid circulating in the passage 16. The cannula 80 is thus then inserted directly to be in contact with the interior surface of the pressure sheath 20.

The seal forming method for forming a seal according to the invention represented in FIG. 5 differs from the one applied to a 'rough bore' flexible pipe in that the heating device 90 comprises of a heating mandrel 94 introduced into the pressure sheath 20 in order to heat the end section 32 at the level of its interior surface and to more rapidly reduce the Young's modulus of the material used for the production of the sheath 20. Thus, the insertion of the cannula 80 is promoted.

In addition, used in combination with the heating mandrel 94 or as an alternative, a heating member 92 such as a heating cover-sheet and/or a heating band wound around the pressure sheath 20 and the ring 74 locally heats the end section 32 and more rapidly reduces the Young's modulus of the material used for the production of the sheath 20.

By way of a variant, the end section 32 is heated with a supply of hot air applied externally in relation to the pressure sheath.

According to yet another variant, a heater pot is disposed externally around the end section 32, in the embodiment represented in FIG. 5.

Advantageously, the end vault 50 is always placed in position around the end section 32 and the front crimping ring 74, after heating of the end section 32.

Figure 6:
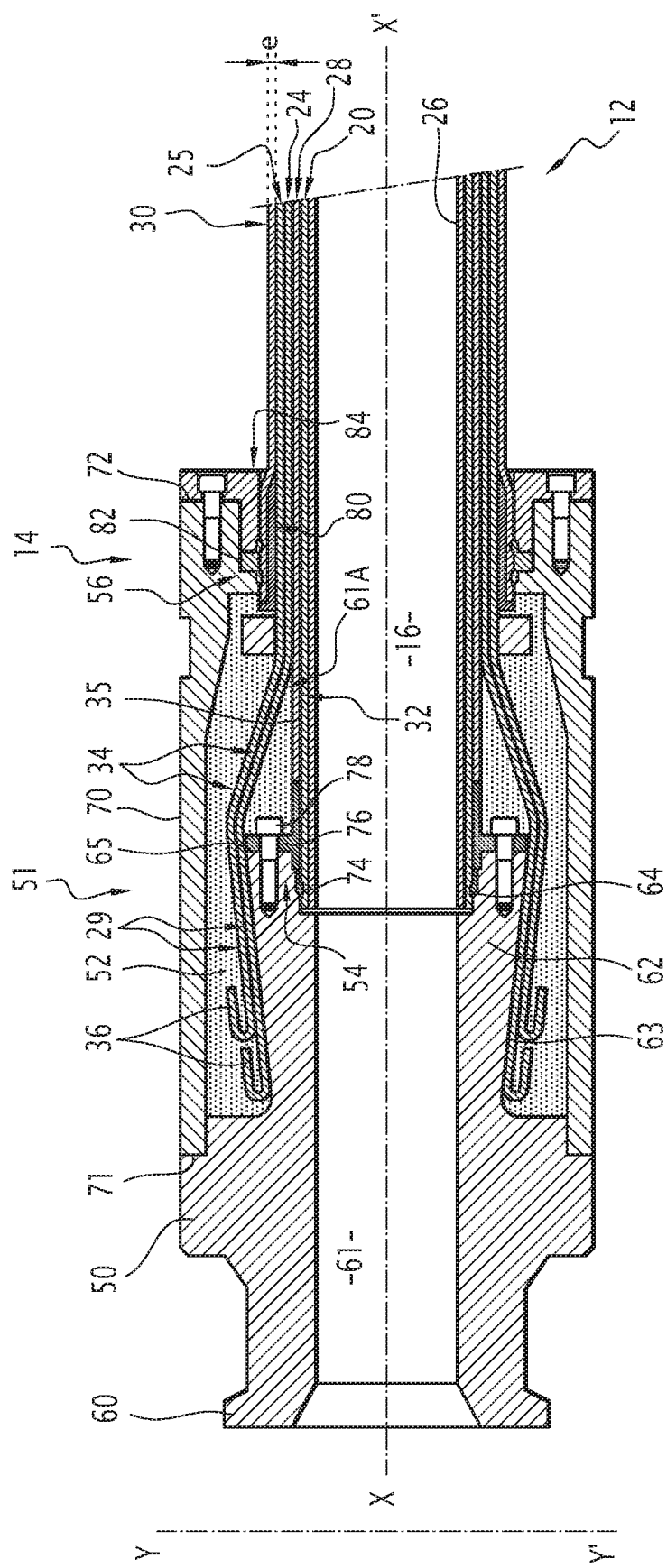
FIG. 6 is a view that is analogous to that in FIG. 2 of the end piece of yet another flexible pipe.

According to yet another variant embodiment of the invention, illustrated in FIG. 6, the flexible pipe 10 has a structure comprising, from the interior to the exterior, an internal carcass 26, a pressure sheath 20, a pressure vault 28, at least one layer of armors 24, 25 for ensuring resistance to axial tensile forces, and an external sheath 30.

In this configuration of the flexible pipe 10, the use of a cannula 80 is not technically feasible.

The step of heating of the end section 32 of the pressure sheath 20 produced during the method for forming the seal of the end piece is used for the release of the stresses linked to the crimping of the pressure sheath 20, since the crimping ring 74 of the front crimping assembly 54 is deformed radially towards the interior into the said sheath 20.

The invention claimed is:

1. A seal forming method for forming a seal in an end piece of a flexible pipe comprising a pressure sheath made from a polymer material, the method comprising:
   providing, around an end section of the pressure sheath, a crimping ring that is configured to be introduced into the pressure sheath;
   placing, around the end section and the crimping ring, an end vault of the end piece, the end vault having an engagement surface for engaging with the crimping ring configured to push the crimping ring radially into the pressure sheath;
   relatively moving the crimping ring in relation to the engagement surface in order to crimp the crimping ring in the pressure sheath;
   the method including, prior to the relative moving of the crimping ring in relation to the engagement surface:
   heating the end section of the pressure sheath, to reduce the Young's modulus of the polymer material of the end section of the pressure sheath and to maintain a reduced Young's modulus during the relative moving of the crimping ring in relation to the engagement surface.

2. The method according to claim 1, wherein the Young's modulus of the polymer material of the end section of the pressure sheath during the relative moving of the crimping ring in relation to the engagement surface, is less than 1000 MPa.

3. The method according to claim 2, wherein the Young's modulus of the polymer material of the end section of the pressure sheath during the relative moving of the crimping ring in relation to the engagement surface, is comprised between 50 MPa and 500 MPa.

4. The method according to claim 1, wherein a temperature of the end section of the pressure sheath during the relative moving of the crimping ring in relation to the engagement surface, is higher than the ambient temperature.

5. The method according to claim 4, wherein the temperature of the end section of the pressure sheath during the relative moving of the crimping ring in relation to the engagement surface, is higher than 50° C.

6. The method according to claim 1, wherein the pressure sheath is made from a polymer material selected from among PVDF, PEK, PEEK, PEEKK, PEKK, PEKEKK, PAI, PEI, PSU, PPSU, PES, PAS, PPE, PPS, LCPs, PPA and/or mixtures thereof.

7. The method according to claim 4, wherein the temperature of the end section of the pressure sheath during the relative moving of the crimping ring in relation to the engagement surface, is comprised between 100° C. and 200° C.

8. The method according to claim 1, wherein the end section of the pressure sheath is heated from the exterior during the heating of the end section of the pressure sheath.

9. The method according to claim 8, wherein an exterior surface of the end section of the pressure sheath is heated by direct contact of a heater with the pressure sheath and/or with the crimping ring.

10. The method according to claim 9, wherein the heater is a heating strip and/or a heating cover-sheet.

11. The method according to claim 8, wherein placing the end vault is carried out prior to the heating of the end section of the pressure sheath, with the heating of the end section of the pressure sheath comprising of the heating of the end vault by direct contact of the end vault with a heater, and the heating of an exterior surface of the end section of the pressure sheath through the end vault.

12. The method according to claim 1, wherein the end section of the pressure sheath is heated from the interior during the heating of the end section of the pressure sheath.

13. The method according to claim 12, wherein the end section of the pressure sheath is disposed around an internal carcass that defines an internal circulation passage for circulating the fluid, the heating of the end section of the pressure sheath comprising of the heating from the interior of the internal carcass.

14. The method according to claim 13, wherein the internal carcass is heated by a heating mandrel and/or by circulation of hot air in the fluid circulation passage.

15. The method according to claim 13, wherein a cannula is interposed between a sacrificial sheath arranged around the internal carcass and the intermediate section of the sheath pressure, the cannula being heated by the internal carcass, an internal surface of the end section of the pressure sheath being heated by the cannula.

16. The method according to claim 1, including measuring a temperature of the end section of the pressure sheath during the heating of the end section of the pressure sheath.

17. A seal forming method for forming a seal in an end piece of a flexible pipe comprising a pressure sheath made from a polymer material, the method comprising:
   providing, around an end section of the pressure sheath, a crimping ring that is configured to be introduced into the pressure sheath;

placing, around the end section and the crimping ring, an end vault of the end piece, the end vault having an engagement surface for engaging with the crimping ring configured to push the crimping ring radially into the pressure sheath;

relatively moving the crimping ring in relation to the engagement surface in order to crimp the crimping ring in the pressure sheath;

the method including, prior to the relative moving of the crimping ring in relation to the engagement surface:

heating the end section of the pressure sheath to reduce the Young's modulus of the polymer material of the end section of the pressure sheath and to maintain a reduced Young's modulus during the relative moving of the crimping ring in relation to the engagement surface, wherein the relative movement of the crimping ring in relation to the end vault is a radial movement relative to an axis of the flexible pipe.

18. A seal forming method for forming a seal in an end piece of a flexible pipe comprising a pressure sheath made from a polymer material, the method comprising:

providing, around an end section of the pressure sheath, a crimping ring that is configured to be introduced into the pressure sheath;

placing, around the end section and the crimping ring, an end vault of the end piece, the end vault having an engagement surface for engaging with the crimping ring configured to push the crimping ring radially into the pressure sheath;

relatively moving the crimping ring in relation to the engagement surface in order to crimp the crimping ring in the pressure sheath;

the method including, prior to the relative moving of the crimping ring in relation to the engagement surface:

heating the end section of the pressure sheath to reduce the Young's modulus of the polymer material of the end section of the pressure sheath and to maintain a reduced Young's modulus during the relative moving of the crimping ring in relation to the engagement surface, wherein the ring has a tapered front edge having an annular bulge, the annular bulge of the tapered front edge of the ring penetrating into the end section of the pressure sheath to form an annular sealing by crimping of the ring.

\* \* \* \* \*